United States Patent
Kando et al.

(10) Patent No.: US 8,318,020 B2
(45) Date of Patent: Nov. 27, 2012

(54) WASHING METHOD AND APPARATUS OF SEPARATION MEMBRANE

(75) Inventors: Koichiro Kando, Handa (JP); Motoharu Noguchi, Handa (JP)

(73) Assignee: Metawater Co., Ltd., Minato-Ku (JP)

( * ) Notice: Subject to any disclaimer, the term of this patent is extended or adjusted under 35 U.S.C. 154(b) by 1026 days.

(21) Appl. No.: 11/681,353

(22) Filed: Mar. 2, 2007

(65) Prior Publication Data

US 2007/0215544 A1  Sep. 20, 2007

(30) Foreign Application Priority Data

Mar. 16, 2006  (JP) ................. 2006-072282

(51) Int. Cl.
*B01D 65/02* (2006.01)
*C02F 1/76* (2006.01)

(52) U.S. Cl. ........ 210/636; 210/639; 210/744; 210/753; 210/758

(58) Field of Classification Search ............... 210/636, 210/634, 639, 739, 744, 749, 758, 767, 753
See application file for complete search history.

(56) References Cited

U.S. PATENT DOCUMENTS

| | | | | |
|---|---|---|---|---|
| 5,647,988 A | * | 7/1997 | Kawanishi et al. | 210/636 |
| 6,811,710 B2 | * | 11/2004 | Simmons | 210/754 |
| 2003/0094409 A1 | | 5/2003 | Minegishi et al. | |
| 2006/0196819 A1 | | 9/2006 | Lu | |

FOREIGN PATENT DOCUMENTS

| | | |
|---|---|---|
| DE | 197 40 327 A1 | 3/1999 |
| JP | 55-129107 A1 | 10/1980 |
| JP | 09-313902 | 12/1997 |
| JP | 2000-246259 | 9/2000 |
| JP | 2001-038165 | 2/2001 |
| JP | 2001-232160 | 8/2001 |
| WO | WO 2004/094046 A1 | 11/2004 |

* cited by examiner

*Primary Examiner* — Krishnan S Menon
*Assistant Examiner* — Katherine Zalasky
(74) *Attorney, Agent, or Firm* — Burr & Brown

(57) ABSTRACT

When a separation membrane (3) is washed with a chemical solution that is a sodium hypochlorite solution, which has a high concentration, diluted with membrane treated water stored in a chemical solution tank (6), an ammonic nitrogen concentration in membrane-treated water is monitored with a monitoring device (9), and a control device (8) controls a chemical solution dosing pump (7) using the concentration measured by the device (9) to adjust a dilution rate. Thereby, even when water quality of membrane-treated water varies, a sodium hypochlorite concentration in backwashing water can be retained constant, and fluctuation in the chemical washing effect can be prevented.

10 Claims, 3 Drawing Sheets

WASHING METHOD AND APPARATUS OF SEPARATION MEMBRANE

FIELD OF THE INVENTION

The present invention relates to a washing method and an apparatus of separation membranes, which are used in water and waste water treatment and the like.

BACKGROUND OF THE INVENTION

In water treatment using a separation membrane, in order to remove deposits on a membrane surface and suppress a rise in a transmembrane pressure difference, backwashing using membrane-treated water is performed. However, in order to degrade and remove deposits, which cannot be removed simply by backwashing, chemical washing using a sodium hypochlorite solution is performed periodically. When a separation subject is surface water, since raw water is clear, an interval of chemical washing is relatively long, but when a separation subject is sewage water, since much contaminant is contained in raw water, for example, chemical washing is performed at a frequency of around once per 2 hours.

This chemical washing is normally performed using washing water obtained by diluting a sodium hypochlorite solution, which has a high concentration, with membrane-treated water adjusted to be a predetermined hypochlorite concentration, as shown in Japanese Patent Application Laid Open (JP-A) No. 09-313902. As this dilution rate, a fixed value is used as far as a concentration of a normally used high concentration sodium hypochlorite solution is not changed. However, although a separation membrane is washed using diluted water, which has been diluted at a prescribed rate, the sufficient chemical washing effects cannot be obtained in some cases. In such cases, although chemical washing is performed, recovery of a transmembrane pressure difference of a separation membrane becomes insufficient, and stable operation cannot be performed.

SUMMARY OF THE INVENTION

Accordingly, an objective of the present invention is to solve the aforementioned previous problems, and to provide a washing method and an apparatus of a separation membrane, which usually allow for stable chemical washing, and which can assuredly remove deposition from a membrane surface and thereby to restore a transmembrane pressure difference.

In order to solve the aforementioned problems, the present inventors thoroughly investigated a cause by which the chemical solution washing effect varies irrespective of washing of a separation membrane using diluted water having a prescribed dilution rate. As a result, we discovered that water quality of membrane-treated water varies depending on the operation condition, such as a biological treatment tank and a coagulation mixing tank placed in its early stage, and is not necessarily constant and, when ammonic nitrogen and an organic nitrogen compound are contained in membrane-treated water, they react with free chlorine to produce chloramines such as $NH_2Cl$, $NHCl$, $NCl_3$ and the like as shown in the following equation, reducing the membrane washing effect of sodium hypochlorite. Since a reaction speed of chloramines are slow, and are substances, which have the poor membrane washing effect, compared with free chlorine, when free chlorine is consumed in production of chloramines, the effect on removing a membrane clogging substance is reduced. That is, when ammonic nitrogen or an organic nitrogen compound is contained in membrane-treated water, a concentration of a washing solution used at chemical washing becomes lower than a predetermined concentration, and the chemical washing effect is deteriorated in some cases.

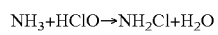

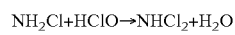

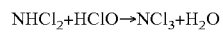

The present invention was concluded based on the discoveries above, and is a method of washing a separation membrane using washing water obtained from diluting a sodium hypochlorite solution with membrane-treated water, monitoring an ammonic nitrogen concentration in membrane-treated water, and adjusting a dilution rate of a sodium hypochlorite solution using the concentration as an index. In the present invention, when a concentration of ammonic nitrogen in membrane-treated water is high, a dilution rate is lowered to increase a sodium hypochlorite concentration in washing water and, conversely, when an ammonic nitrogen concentration in membrane-treated water is low, a dilution rate is increased to reduce a sodium hypochlorite concentration in washing water.

This adjustment of a dilution rate keeps a free chlorine concentration in backwashing water almost constant, and allows for stable chemical washing. It is preferable that a concentration of diluted sodium hypochlorite is in a range of 20 to 1000 mg/L. It is preferable that a dilution rate of a sodium hypochlorite solution is adjusted by controlling an injection amount of sodium hypochlorite with a chemical solution-injecting pump. In addition, it is also preferable that after chemical solution washing of a separation membrane is performed like this, stop a chemical solution dosing pump, and perform the normal backwashing with membrane-treated water to eliminate the remaining chemical solution.

The inventive feature of this washing apparatus a separation membrane of the present invention comprises a separation membrane, a backwashing pump to feed membrane-treated water on a filtrate side of the separation membrane, a chemical solution tank for storing a sodium hypochlorite solution, a chemical solution injecting pump for injecting the sodium hypochlorite solution in the chemical solution tank into backwashing water to dilute it, a device for monitoring an ammonic nitrogen concentration in membrane-treated water, to control device for controlling the chemical solution-injecting pump using an ammonic nitrogen concentration measured with the monitoring device as an index, to adjust a dilution rate. The control device has the function of adjusting a dilution rate so that, when an ammonic nitrogen concentration is high, a dilution rate is decreased and, conversely, when an ammonic nitrogen concentration in membrane-treated water is low, a dilution rate is increased. In a preferable embodiment, the separation membrane is a monolith-type MF membrane or UF membrane made of a ceramic, and the separation membrane is arranged at a stage after a biological treatment tank or a coagulation mixing tank.

According to the present invention, since an ammonic nitrogen concentration in membrane-treated water is monitored, and a dilution rate of a sodium hypochlorite solution is adjusted using the concentration monitored, when a concentration of ammonic nitrogen or an organic nitrogen compound in membrane-treated water is high, a dilution rate can be lowered to increase a sodium hypochlorite concentration in washing water and, conversely, when a concentration of an ammonia or an organic nitrogen compound in membrane-treated water is low, a dilution rate can be increased to reduce a sodium hypochlorite concentration in washing water. For this reason, even when an amount of free chlorine in sodium hypochlorite to be consumed for production of chloramines varies with variation in water quality of membrane-treated water, it becomes possible to maintain a free chlorine concentration in backwashing water approximately constant, and the stable chemical solution washing effect can be exerted.

DETAILED DESCRIPTION OF THE INVENTION

A preferable embodiment of the present invention will be shown below.

Figure 1:
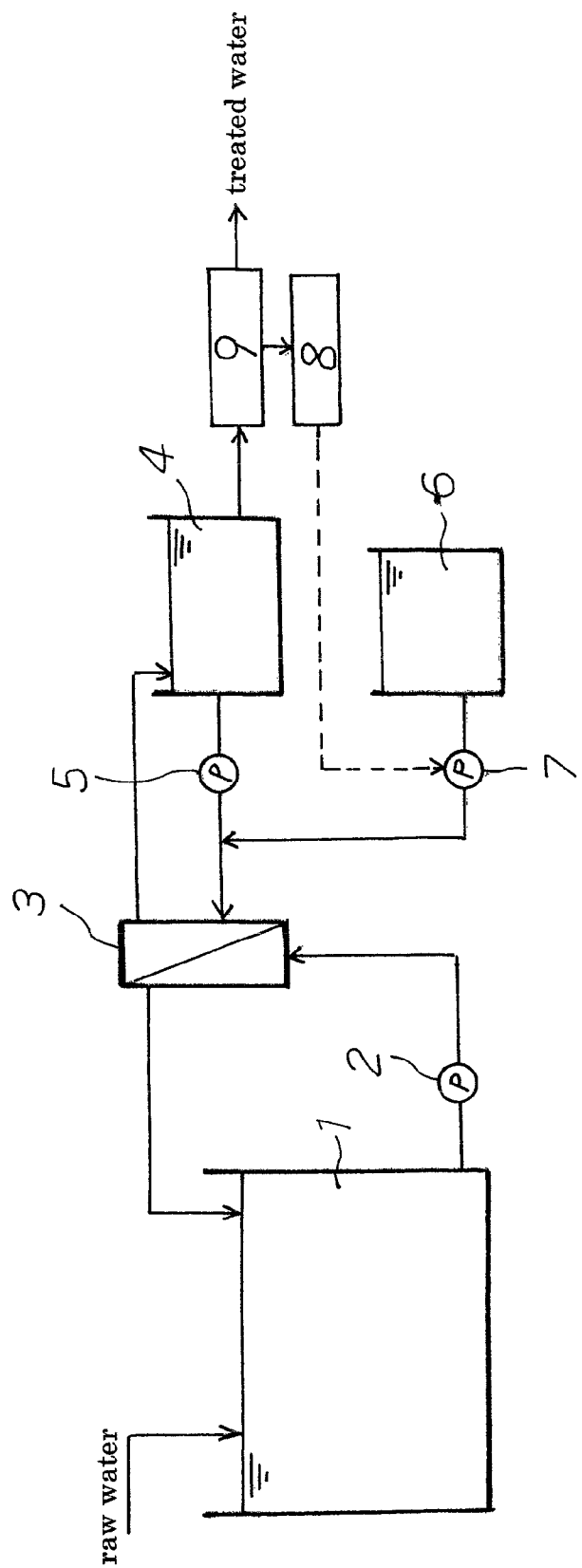
FIG. 1 is a block drawing that shows an embodiment of the present invention.

In FIG. 1, 1 is a biological treatment tank for treating sewage water. Water in the tank is supplied to a separation membrane 3 by means of a circulation pump 2 and membrane separation is performed in a cross flow filtration or a dead end filtration. As the separation membrane 3, an MF membrane or a UF membrane is used, and a material therefor may be a polymer or a ceramic. The shape may be arbitrary such as a tubular membrane, a flat membrane and a hollow fiber membrane in addition to the monolith membrane, and may be an external pressure filtration or an internal pressure filtration. In this embodiment, a monolith membrane made of a ceramic is used. Membrane-treated water from the separation membrane 3 is stored in a filtrate tank 4. Number 5 is a backwashing pump at normal backwashing, use membrane-treated water in the treating water tank 4 on a filtrate side of the separation membrane 3 and performs backwashing. Alternatively, backwashing may be performed using pressured water tank to store backwash water without using backwash pump.

Like this, in the case of the normal backwashing, backwashing with backwashing water without containing chemical solution is performed, but upon periodic chemical washing, a sodium hypochlorite solution with a high concentration in a chemical solution tank 6 is injected into backwashing water with a chemical solution dosing pump 7. A concentration of sodium hypochlorite in a chemical solution tank 6 is usually about 130000 mg-Cl/L, and the chemical solution is diluted with membrane-treated water to a concentration of around 20 to 1000 mg-Cl/L to prepare a washing solution. Then, this washing solution is supplied from a filtrate side of a separation membrane 3 with a pump or the compressed air to extend the washing solution all over a membrane including a raw water side of the membrane. Thereafter, by immersing the separation membrane 3 in the washing solution for certain amount of time, the separation membrane 3 is chemically washed. A dilution concentration thereupon is determined by an injection amount of a chemical solution dosing pump 7. The method of immersing the separation membrane 3 in the washing solution may be performed by flowing the washing solution from a raw water side to a filtrate side of the membrane. In this case, for diluting a high concentration sodium hypochlorite solution, raw water is used. As a procedure, first, a high concentration sodium hypochlorite solution is injected into a raw water supply line, and diluted washing water is extended over the membrane with a raw water pump. After washing water is extended over the membrane, the raw water pump is stopped, and the membrane is immersed in washing water for certain amount of time. After certain amount of time has passed, washing water is discharged to an outside of a system.

Previously, this dilution rate has been set to be, for example, around 1000 times, but in the present invention, a control device 8 is placed for controlling a chemical solution-injecting pump 7 that adjusts a dilution rate. In addition, apart from this, a device 9 for monitoring an ammonic nitrogen concentration in membrane-treated water is placed, and the control device 8 changes a dilution rate using an ammonic nitrogen concentration measured by the monitoring device 9

Figure 2:
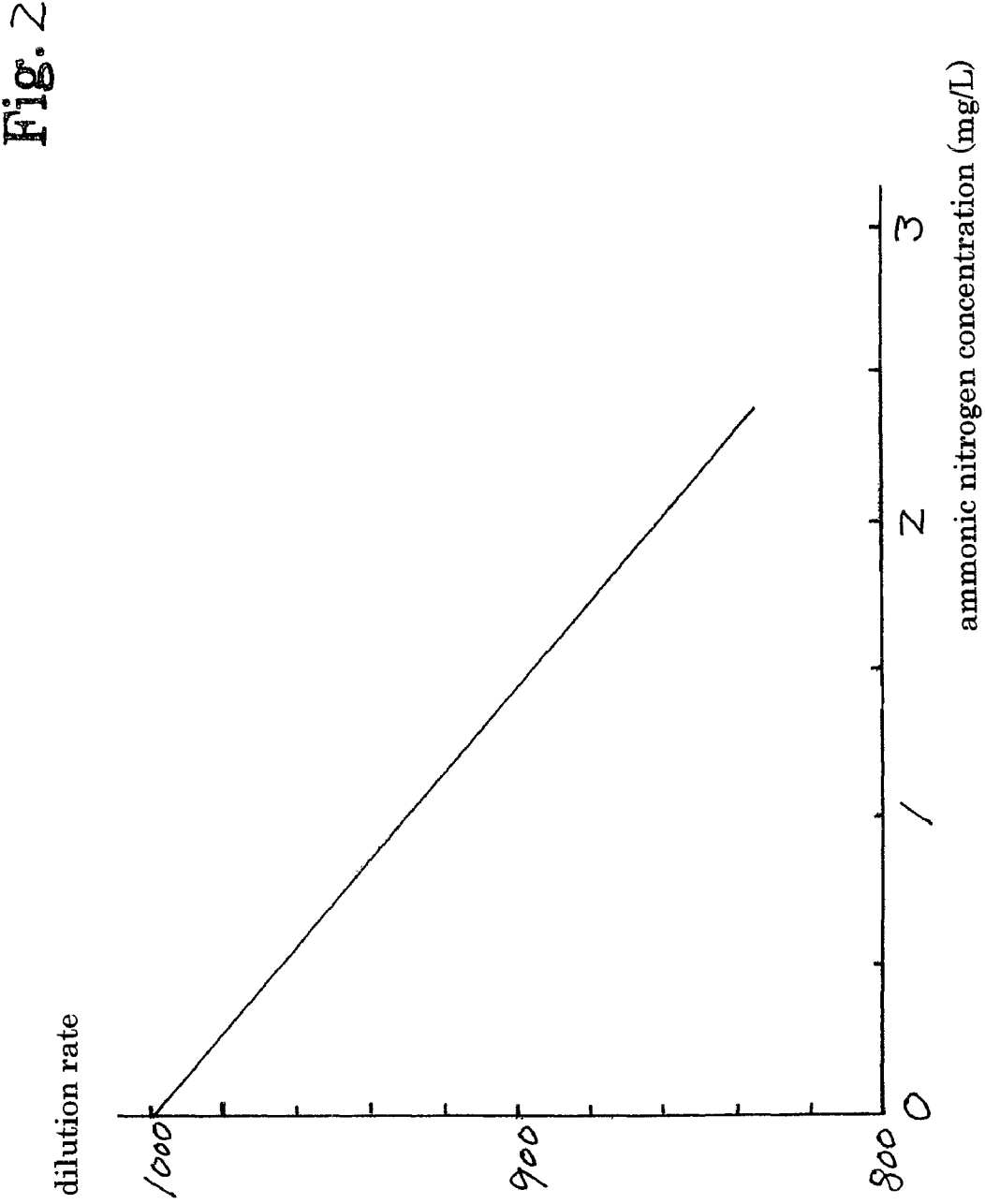
FIG. 2 is a graph showing a relationship between an ammonic nitrogen concentration in membrane-treated water, and a dilution rate.

Currently, a device can directly and automatically measure a concentration of a sodium hypochlorite solution used in backwashing has not been developed yet, however, a device for automatically measuring ammonic nitrogen concentration water has already been developed and sold, for example, as a trade name of automatic ammonium ion monitors (Model AMNA-101/102) from HORIBA, Ltd. Then, an ammonic nitrogen concentration in membrane-treated water is monitored and, when the concentration is high, since free chlorine in sodium hypochlorite easily reacts with ammonic nitrogen to produce chloramines, the control device 8 is set to reduce a dilution rate to increase a concentration of sodium hypochlorite in backwashing water as shown in FIG. 2. Conversely, when an ammonic nitrogen concentration in membrane-treated water is low, by increasing a dilution rate, a concentration of sodium hypochlorite in backwashing water is reduced and consumption of sodium hypochlorite is suppressed in order to reduce the running cost.

As a result, even when an amount of free chlorine in sodium hypochlorite to be used to produce chloramines varies in water quality of membrane-treated water, it becomes possible to maintain a free chlorine concentration in backwashing water approximately constant, and the constant chemical washing effects can usually be obtained. Thereby, it becomes possible to prevent a rise in a transmembrane pressure difference to stably operate the separation membrane 3. Generally, an amount of backwashing water to be used in chemical washing is around 1 to 2 times a volume of a casing accommodating the separation membrane and, a chemical solution injecting pump 7 is stopped after the chemical washing, and normal backwashing is performed to prevent a chemical solution from remaining inside the separation membrane 3.

The present invention can be widely applied to a membrane separation system targeting sidestreams, industrial waste water, garbage-leaching water, night soil, agricultural waste water, livestock waste water, aquafarming waste water, and seawater in addition to the aforementioned water and waste water. Examples of the specific application system including sewage water tertiary treatment (final sedimentation tank effluent treatment), membrane bioreactor treatment, and pretreatment for seawater desalination RO membrane.

Figure 3:
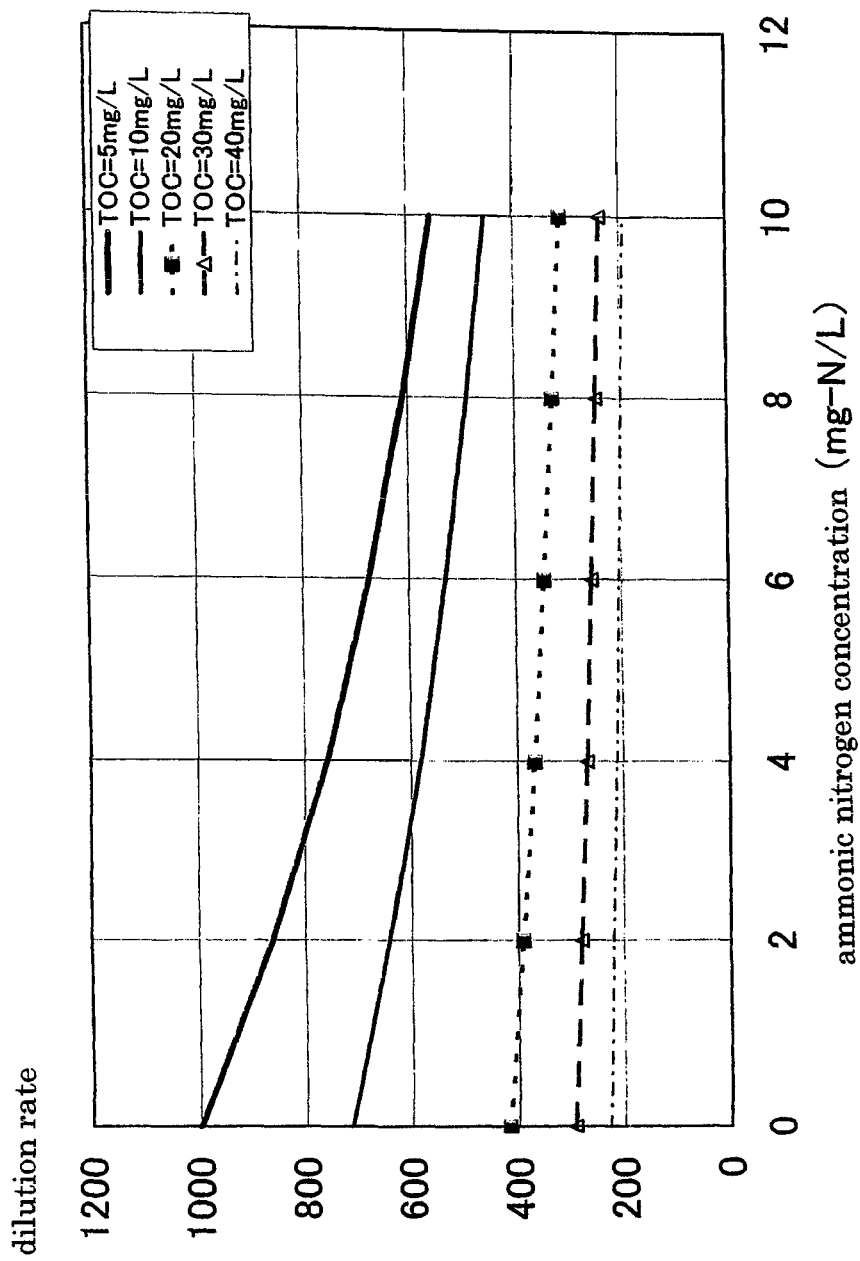
FIG. 3 is a graph showing a relationship among concentrations of TOC, ammonic nitrogen in membrane-treated water, and a dilution rate.

It is further preferable that a dilution rate is controlled by measured values of COD (chemical oxygen demand) and TOC (total organic carbon concentration) that can be automatically measured in addition to an ammonic nitrogen concentration in membrane-treated water. This is because COD and TOC consume free chlorine. In this case, the control device 8 may be operated so that, when a COD or TOC value is high, a dilution rate is further decreased and, when a COD or TOC value is low, a dilution rate is further increased. A graph is shown in FIG. 3 that shows the case of the dilution rate in which TOC concentration is changed from 5 mg/L to 40 mg/L. As shown in the graph, a change of the dilution rate due to the ammonia nitrogen concentration is large when TOC value is low. However, the effect of the TOC becomes dominant as the amount increases, and therefore changes in the dilution rate due to the ammonia nitrogen concentration becomes smaller. Moreover, COD has indicators, such as potasium permanganate (CODMn) and potassium bichromates (CODCr), and either one can be used as a COD indicator.

EXAMPLES water in a biological treatment tank for performing activated sludge treatment of sewage water was circulated into a ceramic monolith membrane placed outside the tank, to perform a cross flow filtration. The membrane-separated water was stored in a treated water tank, backwashing was performed with a backwashing pump every 40 minutes, and chemical washing was performed every 120 minutes. A chemical washing was performed for 2 minutes using a washing solution obtained diluting by injecting a sodium hypochlorite solution having a concentration of 130000 mg-Cl/L stored in a chemical solution tank into backwashing water with a chemical solution injecting pump. Upon this chemical washing, the washing solution was flown from a filtrate side to a raw water side of the separation membrane. And, at a stage at which the separation membrane was immersed in the washing solution, the state thereof was retained for 2 minutes.

Since a dilution rate was previously fixed at 1000, the chemical washing effect varied greatly and, for example, a rising rate of a transmembrane pressure difference was increased 2 times more than that of at an ammonic nitrogen concentration of 0 mg-N/L in some cases. To the contrary, according to the present invention, an ammonic nitrogen concentration in membrane-treated water was monitored and, when the concentration was increased to 2 mg-N/L, a dilution rate was controlled to be 860 times and, when the concentration was reduced to 0 mg-N/L, a dilution rate was controlled to be 1000 times, thereupon, the chemical washing effect was stabilized and, even when an ammonic nitrogen concentration in membrane-treated water varied between 0 mg-N/L and 2 mg-N/L, a rising rate of a transmembrane pressure difference became equivalent as compared with the case where an ammonic nitrogen concentration was usually 0 mg-N/L. A transmembrane pressure difference is a difference in a pressure difference between a raw water side and a filtrate side of a membrane, and a rising rate of a transmembrane pressure difference is a rate of increase of a transmembrane pressure difference. Therefore, a lower rising rate of a transmembrane pressure difference means that stable membrane filtration can be performed for a long period of time.

In addition, since an organic substance varied greatly in raw water used, previously, when a dilution rate was fixed at 1000 times, the chemical washing effect varied greatly and, for example, a rising rate of a transmembrane pressure difference greatly differed in some cases between the case where a TOC concentration was 6 mg/L, and the case where a TOC concentration was 8 mg/L. To the contrary, according to the present invention, an ammonic nitrogen concentration and a TOC concentration in membrane-treated water were monitored, a dilution rate was changed as described above in response to variations in an ammonic nitrogen concentration and, when a TOC concentration was increased to 8 mg/L, a dilution rate was controlled to be 830 times and, when the concentration was reduced to 6 mg/L, a dilution rate was controlled to be 1000 times, thereby, the chemical washing effect was stabilized. The aforementioned dilution rate is one example of dilution rates used when an ammonic nitrogen concentration was constant as 0 mg-N/L. As a result, even when a TOC concentration varied between 6 mg/L and 8 mg/L, a rising rate of a transmembrane pressure difference became equivalent as compared with the case where a TOC concentration was usually 6 mg/L.

According to the present invention, even when the operation condition, such as a biological treatment tank and an coaggulation mixing tank placed at pretreatment stage of a separation membrane varies, it becomes possible to operate membrane filtration stably and, moreover, the running cost can be reduced by making an amount of sodium hypochlorite to be used reasonable.

What is claimed is:

1. A washing method for a separation membrane, the method comprising:
    measuring an ammonic nitrogen concentration level in membrane-treated water from a membrane-treated water tank;
    removing a portion of said membrane-treated water from said membrane treated water tank;
    forming washing water by adjusting a dilution rate of a sodium hypochlorite solution in said portion of said membrane-treated water based on said measured ammonic nitrogen concentration level; and
    washing the separation membrane periodically with said washing water,
    wherein adjusting the dilution rate of said sodium hypochlorite solution in said membrane-treated water maintains a free chlorine concentration in said washing water substantially constant, and wherein maintaining a constant free chlorine concentration level in said washing water maintains stable operation of the separation membrane.

2. The washing method of claim 1, wherein the dilution rate of said sodium hypochlorite solution in said membrane-treated water is reduced to increase the concentration level of said sodium hypochlorite in said washing water when the ammonic nitrogen concentration level in said washing water is high, and the dilution rate of said sodium hypochlorite solution in said membrane-treated water is increased to reduce the concentration level of said sodium hypochlorite in said washing water when the ammonic nitrogen concentration level in said washing water is low.

3. The washing method of claim 1, further comprising measuring a total organic carbon concentration and adjusting the dilution rate of said sodium hypochlorite solution in said membrane-treated water using the measured total organic carbon concentration together with the measured ammonic nitrogen concentration level.

4. The washing method of claim 1, wherein adjusting the dilution rate of said sodium hypochlorite solution in said membrane-treated water is performed by controlling an amount of sodium hypochlorite solution injected by a chemical solution dosing pump.

5. The washing method of claim 1, wherein said sodium hypochlorite solution concentration in said membrane-treated water is in a range of 20 to 1000 mg/L.

6. The washing method of claim 4, further comprising:
    stopping the chemical solution dosing pump after washing the separation membrane, and then performing a normal backwashing with membrane-treated water.

7. A washing apparatus for a separation membrane comprising:
    a separation membrane, a backwashing pump for driving a portion of membrane-treated water on a filtrate side of the separation membrane, a chemical solution tank for storing a sodium hypochlorite solution, a chemical solution dosing pump for injecting sodium hypochlorite solution from the chemical solution tank into said portion of said membrane-treated water to dilute the sodium hypochlorite solution to form backwashing water, a monitoring device for monitoring an ammonic nitrogen concentration in said membrane-treated water, and a control device for controlling the chemical solution dosing pump based on the ammonic nitrogen concentration measured with the monitoring device to adjust the dilution rate, wherein adjusting the dilution rate of said sodium hypochlorite solution in said membrane-treated water maintains a free chlorine concentration in said backwashing water substantially constant, and wherein maintaining a constant free chlorine concentration level in said backwashing water maintains stable operation of the separation membrane.

8. The washing apparatus of claim 7, wherein the control device adjusts the dilution rate of the sodium hypochlorite solution such that when the ammonic nitrogen concentration is high the dilution rate is decreased, and when the ammonic nitrogen concentration is low the dilution rate is increased.

9. The washing apparatus of claim 7, wherein the separation membrane is arranged after the stage of at least one of a biological treatment tank and a coagulation mixing tank.

10. The washing apparatus of claim 7, wherein the separation membrane is a monolith-type MF membrane or a ceramic UF membrane.

* * * * *